Figure 1:
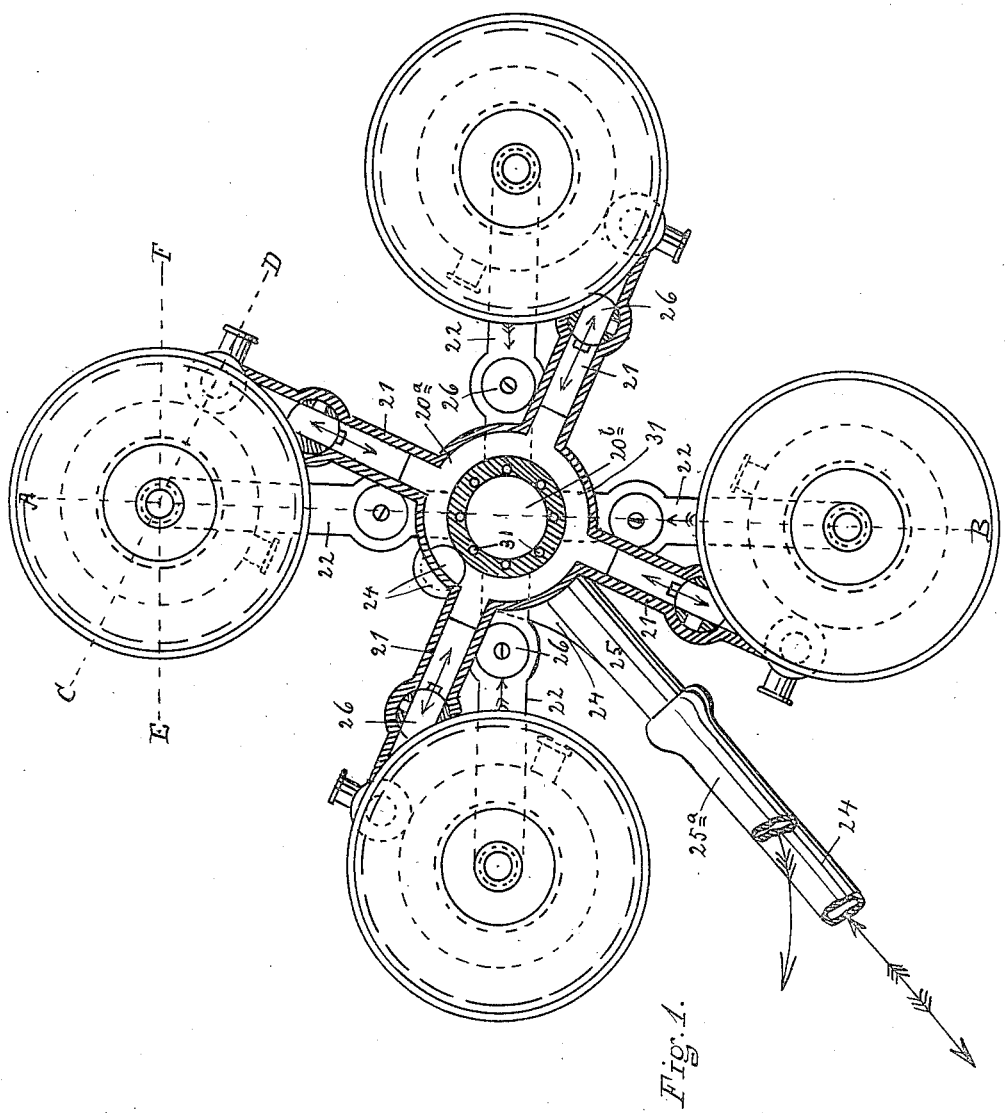

No. 884,781.

PATENTED APR. 14, 1908.

W. J. UEBLER.
MILKING MACHINE.
APPLICATION FILED MAR. 18, 1907.

5 SHEETS—SHEET 1.

WITNESSES
Rich. A. George
Geo. E. Rendell

INVENTOR
WILLIAM J. UEBLER
Robinson, Martin & Jones
ATTORNEYS.

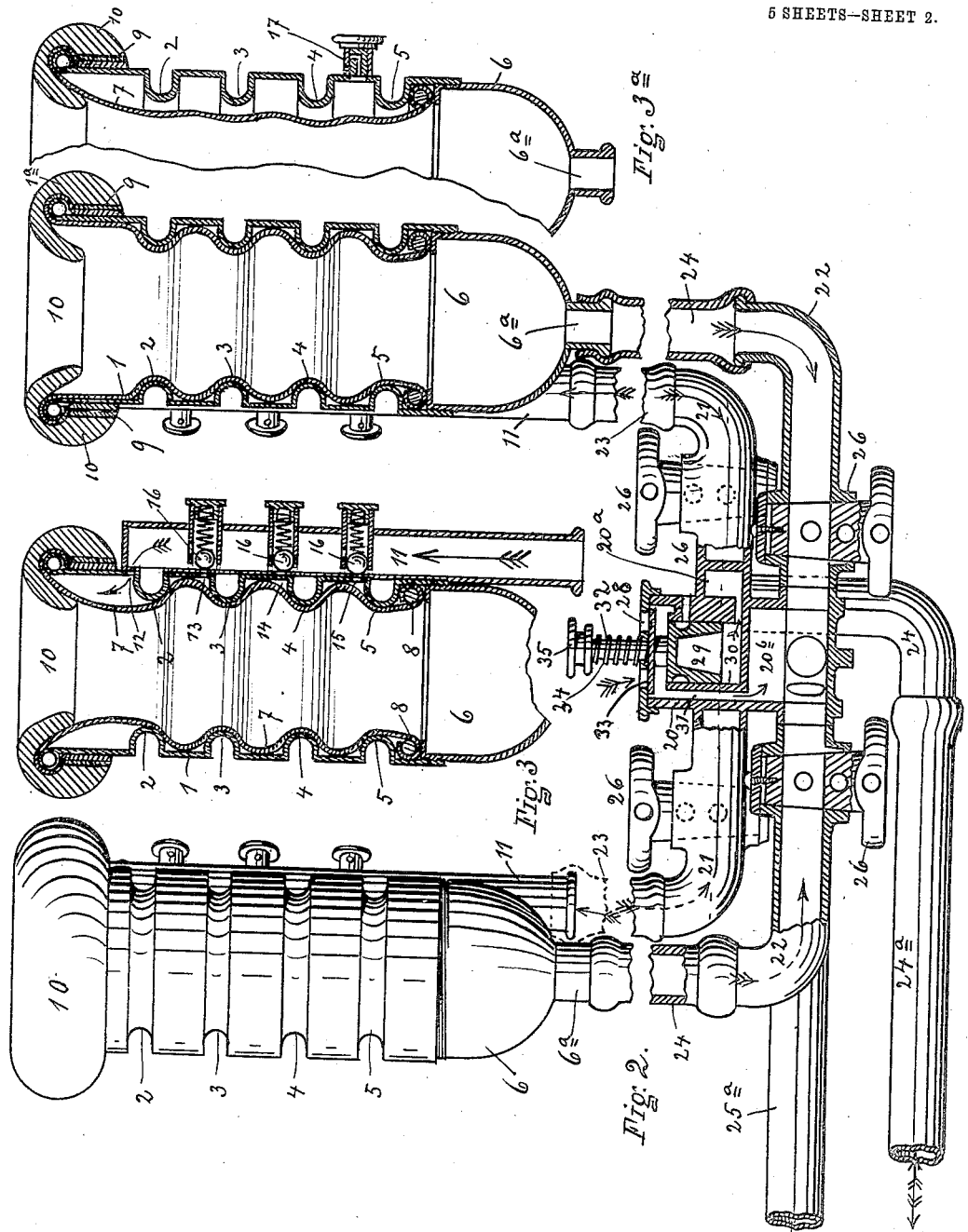

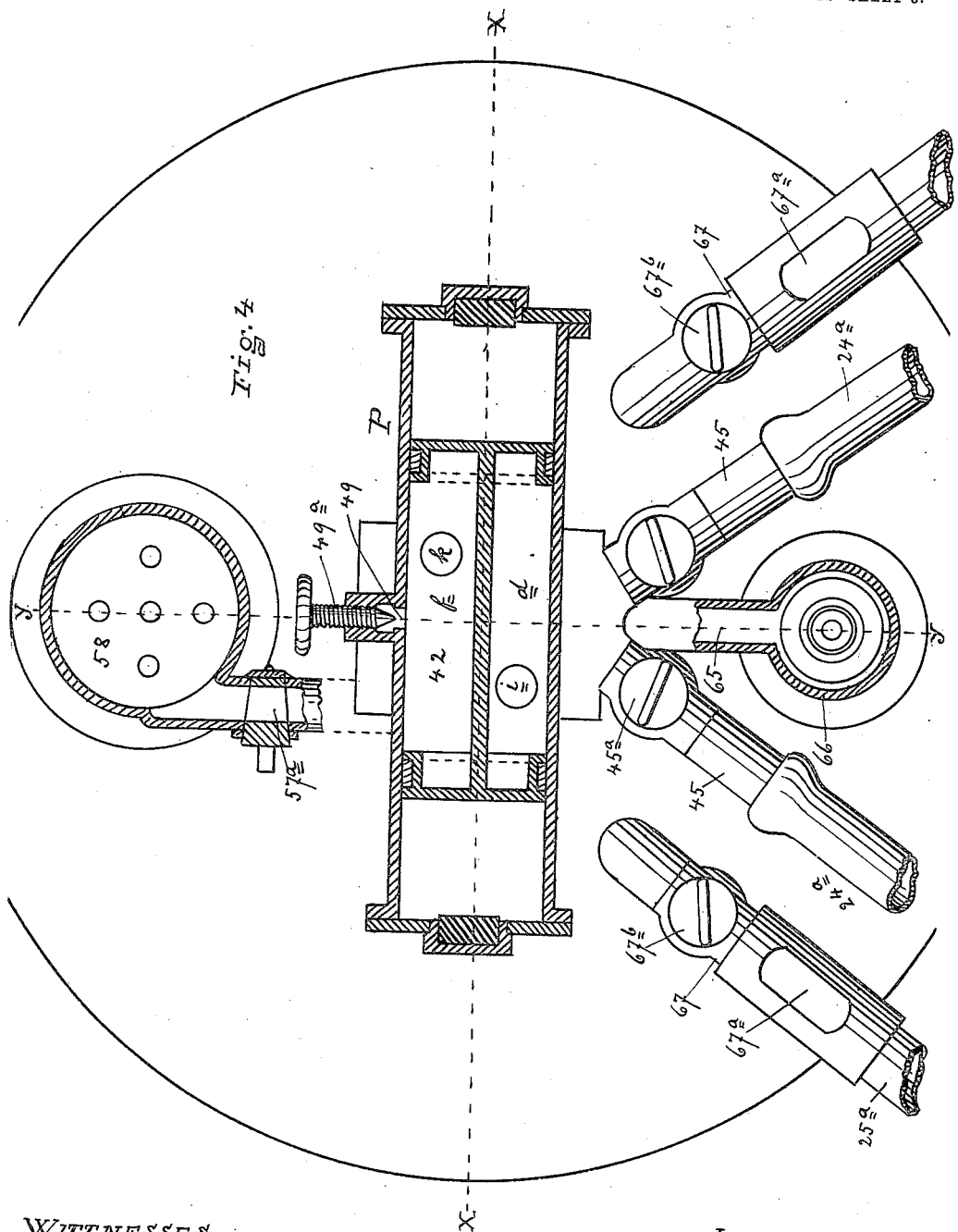

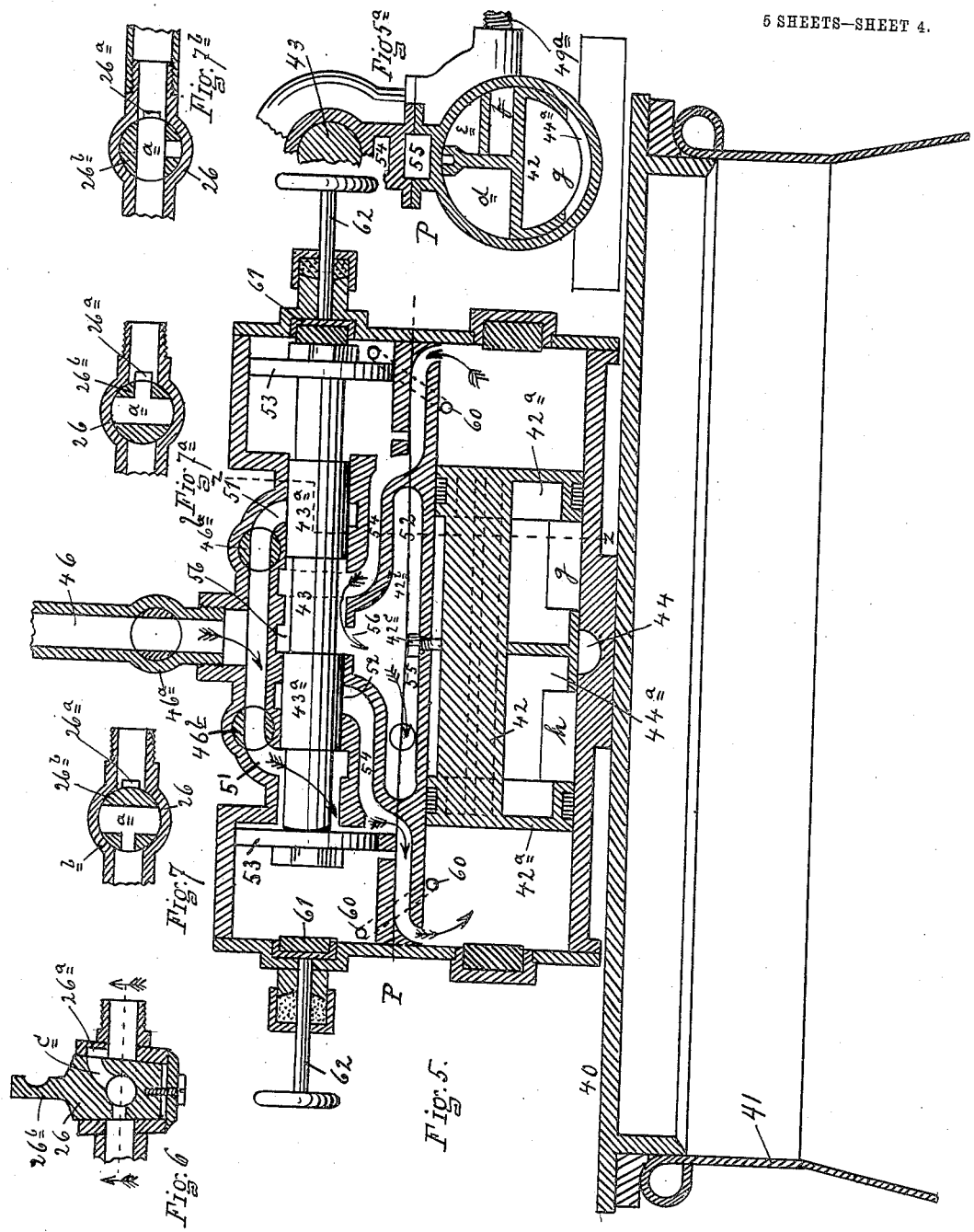

No. 884,781. PATENTED APR. 14, 1908.
W. J. UEBLER.
MILKING MACHINE.
APPLICATION FILED MAR. 18, 1907.
5 SHEETS—SHEET 5.
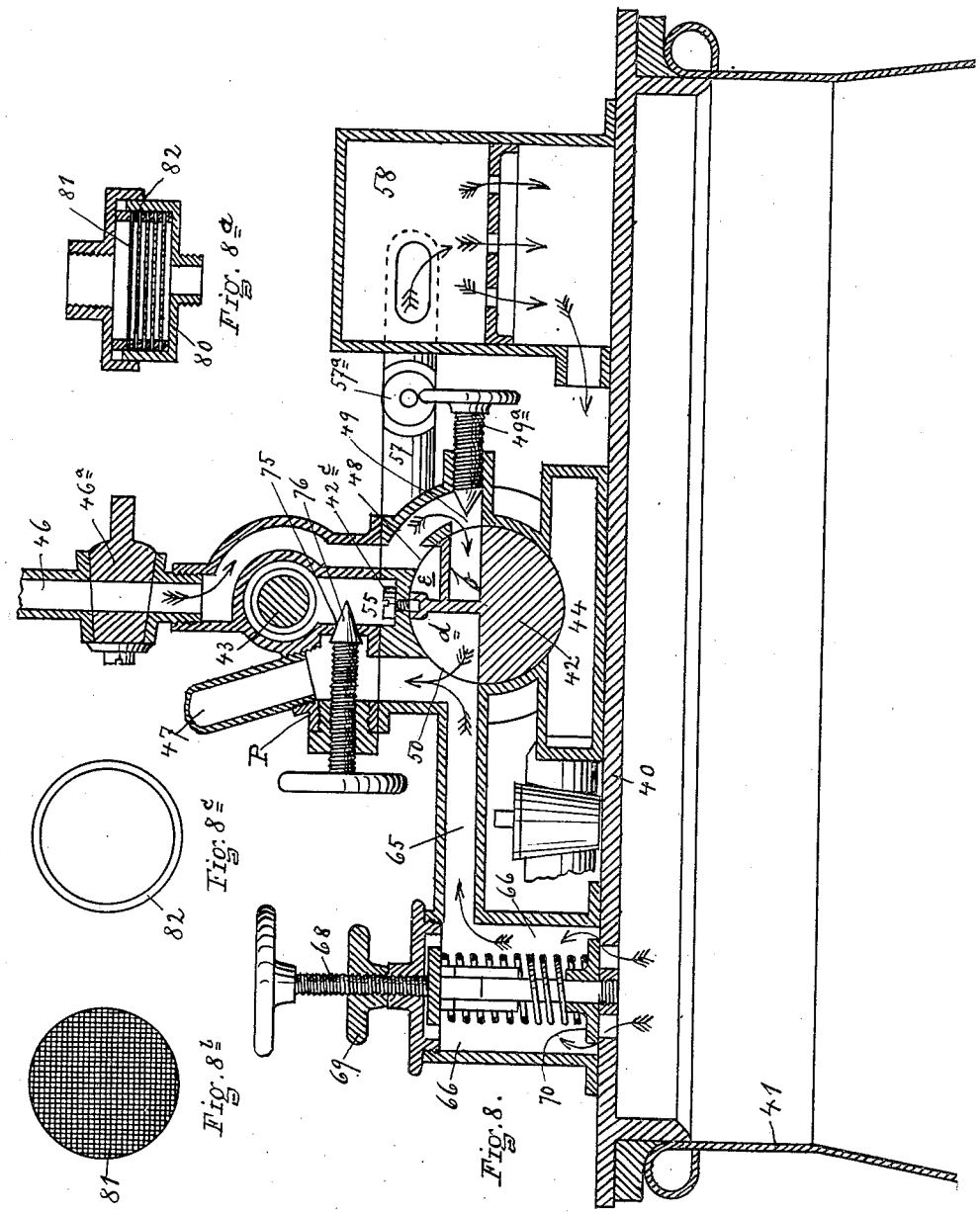
WITNESSES
Rich. A. George
Geo. E. Rendell
INVENTOR
WILLIAM J. UEBLER
BY Robinson, Martin & Jones
ATTORNEYS.

UNITED STATES PATENT OFFICE.

WILLIAM J. UEBLER, OF SCHUYLER, NEW YORK.

MILKING-MACHINE.

No. 884,781.          Specification of Letters Patent.      Patented April 14, 1908.

Application filed March 18, 1907. Serial No. 362,802.

*To all whom it may concern:*

Be it known that I, WILLIAM J. UEBLER, of town of Schuyler, in the county of Herkimer and State of New York, have invented certain new and useful Improvements in Milking-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my invention is to provide a milking machine embodying certain improvements and features of construction which make it efficient and desirable, and which are of that simple construction which enable the machine to be repaired and maintained, as to its necessarily removable parts, cheaply and expeditiously.

Figure 1 is a plan view of the set of teat cups with certain parts of the connecting tubes and their appurtenances shown in section. Fig. 2 is a side elevation in part of a set of teat cups and in part a vertical section of a teat cup and of the connecting tubes and their appurtenances. The sectional portion of this figure is taken on line A—B of Fig. 1. Fig. 3 is a sectional detail of the teat cup taken on line C—D of Fig. 1. Fig. 3$^a$ is another sectional detail of the teat cup. Fig. 4 is a plan view of the receiving receptacle cover with certain details of the mechanism shown in horizontal section. Fig. 5 is a vertical sectional view of the top of the receiver receptacle, the receiver cover and of certain mechanical parts mounted thereon, the section being taken on line x—x of Fig. 4. Fig. 5$^a$ is a partial section taken on line z—z of Fig. 5. Fig. 6 shows a vertical section, and Figs. 7, 7$^a$ and 7$^b$ show a horizontal section of a regulating stop cock employed in the construction in various positions which it is adapted to assume. Fig. 8 shows a vertical section of the receiver cover and the mechanism mounted thereon taken on line y—y of Fig. 4. Figs. 8$^a$, 8$^b$ and 8$^c$ show details of a filtering or screening device, which may be employed in the construction.

Referring to the reference letters and figures in a more particular description, 1 indicates the body of the teat cup which is preferably of thin sheet metal and in the main of a cylinder shell form, having internal encircling ribs 2, 3, 4 and 5 spaced at suitable intervals and rounded on their inner sides. The lower end of the teat cup body is closed by a cup shaped cap 6, having an outlet opening through the nipple 6$^a$ onto which an elastic flexible tube is adapted to be placed. The teat cup is provided with an elastic, flexible, tubular lining 7, which, at its lower end, is folded around a ring 8 placed in the lower end of the teat cup body and held by the rib 5 as a shoulder on one side, and the lining is secured by the cap 6 which is screwthreaded into the lower end and grips the lining and ring 8 between the cap and the rib 5. The upper end of the lining 7 is folded over the upper edge of the teat cup body, which has a bead 1$^a$ at its edge, and down on the outer side where it is held first by a spring band 9 and farther by the elastic mouthpiece 10.

The teat cups are provided in a set of four connected to a common means for operating the same. At the side each teat cup is provided with a section of tube 11 connecting with the space between the body and the lining 7 by four ports, 12, 13, 14 and 15. The uppermost of these ports is located just above the internal rib 2, while the other three open into the depressions between the internal ribs 2, 3, 4 and 5. The three ports 13, 14 and 15 are provided with spring pressed valves 16, which close these ports against fluid passing inwardly, but permit the opening for outward passage. Each teat cup is also provided with one or more manually operatable vent cocks 17.

For each set of teat cups there is provided a common junction and controlling device, consisting in the main of body 20, having two chambers 20$^a$ and 20$^b$ and four stub tubes 21, 21, 21, 21, connecting with the chamber 20$^a$ and four stub tubes 22, 22, 22, 22, connecting with chamber 20$^b$. The stub tubes 21 are connected with the lower ends of the tubes 11 respectively by sections 23 of flexible tube, and the stub tubes 22 are connected with the nipples 6$^a$ respectively on the lower ends of the teat cups by sections of flexible tube 24. From the chambers 20$^a$ and 20$^b$ respectively lead tubes 24$^a$ and 25$^a$.

To regulate or entirely close the passages through the tubes 21 and 22, a stop cock 26 of a peculiar construction is employed. This consists of a socket having a conical opening to receive the plug part, together with a supplemental opening 26ª. The revoluble plug part 26ᵇ has passage ways a, b and c, the first extending diametrically through the plug, the second extending from the passage a radially through one wall, and the third extending in an upwardly and outwardly direction through the other wall from the passage a. The passage a is of the full capacity of the tube, while b and c are much reduced and the latter is adapted to register with the supplemental opening 26ª only.

For controlling the pressure and facilitating the operation of the teat cups, there is provided a manually and automatically opening valve 33 and piston 29 therefor. The piston is arranged in a cylinder 30 in the upper part of the body 20 and the space above the piston is placed in communication with the space below the cylinder by the passage ways 31. The piston in addition to carrying the valve 33 also has a stem 32 which passes through the head 28 and carries a spring 34, and is provided with an adjustable knob 35 confining and compressing the spring 34 between itself and the casing head 28. The head 28 has inlet openings or passages therethrough, which are controlled by the valve 33. The cylinder beneath the piston 29 is placed in communication with chamber 20ª by the passage shown, and the piston is provided adjacent to the top with an encircling groove adapted to register with the drain passage to the exterior shown.

For controlling the operation of the teat cups and their mechanism described, there is provided a pulsator and regulating mechanism, which, with its appurtenances, may now be described. The mechanism is preferably mounted on the cover 40 of the milk receiving receptacle 41, which cover is adapted to close the receptacle particularly against the entrance of external air when a vacuum is created in the receptacle or the pressure therein reduced below normal atmospheric pressure. The pulsator embodies in the main two automatic piston valve mechanisms, 42 and 43, together with suitable chambers for containing these valves and suitable ports and passage ways in connection therewith. The valve 42 controls directly by operating in connection with the port 44 the fluid or gas used in operating the pressure side of the apparatus, the same being connected through the pipes 45 and a suitable piece of flexible tubing with the chamber 20ª before mentioned. This valve 42 also serves to control the application of suction to the pressure side of the teat mechanism; also through the tubes before mentioned and the chamber 20ª.

Fluid under pressure or compressed air or gas is supplied from a suitable compressor to the pulsator through the tube 46, while the pulsator is also placed in communication with a suitable suction or vacuum creating mechanism or apparatus through the medium of tube 47. The fluid under pressure is supplied through the pipe 46 to two ports 48 and 49 in one side of the cylinder opening, which receives the valve 42, while the suction or vacuum side is also connected with this cylindrical opening through a port 50. The valve 42 while being of a general cylindrical form, having particularly the heads 42ª at either end closely fitting the cylindrical opening, in which the valve is located, consists more particularly of a series of walls dividing the valve into chambers $d, e, f, g$ and $h$. The chamber $d$ is placed in communication with the chamber $h$ by an opening $i$, while the chamber $f$ is placed in communication with the chamber $g$ by an opening $k$.

In order to prevent the valve 42 from rotating on its own axis in the cylindrical opening, in which it is contained and still permit it to have its free longitudinal reciprocating motion, there is provided in the upper edge of the valve a longitudinal groove 42ᵇ, which receives the inwardly projecting end of a screw or pin 42ᶜ. There is provided for controlling the size of the available opening through the port 49 an adjustable valve provided on the end of screw 49ª.

The valve body 43 has two cylindrical portions 43ª, 43ª, which are the valves proper, and control circular ports 51, 51 and 52, 52 provided in cylindrical openings in the pulsator body. It is also provided with piston heads 53, 53 at either end arranged in cylinders respectively in the pulsator body. The port 51 is the terminus of a branch of pressure supply pipe 46, while ports 52 connect by passages 54 respectively with the ends of the cylinder containing the valve 42. An exhaust chamber 55 is provided with a port 56 and is connected by a tube 57 connecting with a muffler 58 located on the cover 40. The cylinders containing the pistons 53 and valve 42 are placed in communication by passages 60. The end of the passage at the cylinder containing the valve 43 is adapted to register with the chamber $e$ in the valve 42, while the end of the passage 60 in the cylinders containing the pistons 53 is at the outer side of the piston 53 when in its outer position. Bumpers 61 are provided for limiting the movement of the valve body 43 with its appurtenances in each direction, and these bumpers are provided on push buttons 62 extending through suitable stuffing boxes, whereby movement can be given manually to the valve body 43.

The suction pipe 47 is also placed in communication with the interior of the receptacle through the medium of the tube 65 and the chamber 66, which contains a spring pressed regulating valve 70 with means for adjusting the tension of the spring, consisting of the screw 68 and the lock nut 69. The tubes 45 on the receptacle cover are connected by flexible tubes 24ª with stub tubes 24 mentioned. The stub tube 25 is connected by means of a section of flexible tube 25ª with a rigid section of tube 67 provided on the head 40 of the receptacle, which furnishes an inlet opening through the head 40. This section 67 will preferably include a glass tube portion 67ª, through which the flow of the milk may be observed, and a stop cock 67ᵇ for controlling the passage. The sections of tube 45 before mentioned will also preferably be provided with stop cocks 45ª. Two or more sets of teat cups may be connected with the same receptacle. Means for making connection with two sets of teat cups are shown in Fig. 4.

The operation of the device may be briefly described as follows. The pipe 46 being connected with some suitable source of supply of fluid or air under pressure and the tube 47 being connected with some suitable suction pump or apparatus, the teat cups are applied in the usual and obvious manner. The suction through the pipe 47 exhausts or rarefies the air in the receptacle 41 and the degree of rarefaction may be regulated by adjusting the pressure of the spring on the valve 70. A suction is applied to the teat in the teat cup through the medium of the tube 25ª, and the connections heretofore described, to the nipple 6ª at the lower end of the teat cup. During the time that the valve 42 is in the left-hand end of its cylinder, as shown in Fig. 5, the pressure from pipe 46 is communicated through port 49, chamber f of valve 42, opening h of the same, chamber g of the same, to port 44, from which communication is established through tube 24ª with the tube 11, and thence through the port 12 to the space between the teat cup body and the lining 7.

It will be noted that the pressure is introduced first at the upper end of the lining, and as the inflation gradually takes place the lining is peeled off, so to speak, from the projecting side of rib 2 until the air or fluid is adapted to enter the space between ribs 2 and 3, when a continuation of the inflation gradually fills this space until the lining is peeled off from the top of rib 3 and the operation is continued until a full inflation has been accomplished. Thus the operation is to squeeze the upper portion of the teat tightly and gradually continue the pressure longitudinally down the teat until the lower end is reached, during all of which time a suction is maintained on the lower end of the teat. An interval of time for the inflation of the lining is provided in the movement of the valve 42 to and fro through a half of its stroke in its cylinder. There is also a certain neutral period during the time that the effective valve face 44ª of the valve 42 is passing over the port 44. When this valve face has passed the port 44 and the port is put in communication with the chamber h, the pressure is cut off from the space between the lining and the casing of the teat cups, and a suction substituted therefor.

It will be noted that the space h is in communication through the opening i with the space d of the valve 42, which in turn is in communication with the suction apparatus. In exhausting the contents of the space between the lining 7 and the shell of the teat cup, the fluids may pass outwardly through the four ports, 12, 13, 14 and 15 into the pipe 11. Thus the space may be quickly emptied, and, further than that, the lining between the several ribs brought well back into the space between the ribs.

An interval of time for the exhausting operation, as before described, is provided in the movement of the valve 42 to and fro through the other half of its movement in the right-hand end of its cylinder as the construction is shown in Fig. 5. The fluid pressure from the pipe 46 is also utilized to move the valve 42 alternatively in one direction and then the other. This movement is controlled by the valve mechanism generally designated as 43. As the parts are shown in Fig. 5, it will be noted that the pressure is being taken through the port 51 on the left-hand end; thence around the body of the valve 43, and, entering the chamber which receives the piston head 53, passes through a port into passage 54 and thus enters the cylinder containing the valve 42 at the left-hand end. The pressure accumulating in this end of the cylinder will cause the valve 42 to move to the right. When it has reached the right-hand end of the cylinder or substantially so, the end of passage way 60 will be put in communication with chamber e of valve 42, which also being supplied with fluid pressure the fluid passes into the space between the head of the cylinder and the piston 53 on the right-hand of the pulsator, forcing the valve 43 with all its connected parts to a left-hand position. When this is done, it closes the port 51 on the left-hand end and opens the port 51 on the right-hand end, allowing the fluid pressure to operate on the right-hand end of the valve 42 to move it in the opposite direction. An exhaust passage from one or the other end of the cylinder containing the valve 42 is always provided for through the passage 54, and the port 56 which surrounds a reduced portion of the valve 43; thence to chamber 55, the exhaust pipe 57 and the muffler 58. In case the valve 43 should become displaced into a neutral position intermediate of its normal stationary positions, it can be put into motion by pushing the same by means of one or the other push buttons 62. It will also be noted that the arrangement is such that the movement of the valve 43 is cushioned at either end of the stroke by the same fluid pressure which it controls.

The speed with which the pulsator will operate can be regulated either by means of the general stop cock 46ª or the minor stop cocks 46ᵇ provided in the branches of supply pipe 46 and more particularly by the latter. The force and speed with which the teat cups will be inflated can be controlled by opening or closing more or less the set valve 49ª. A variation in the operation of the teat cups even of the same set may be effected by operating the regulating cocks 26. It will be noted that when these cocks 26 are placed in the position shown in Fig. 6 that they are much reduced in their carrying capacity, which accordingly slows up the operation. Sometimes this may be desirable on the pressure side and sometimes on the suction side and sometimes both. This provides facility for adapting the machine to hard and easy milking teats and also to long and short teats.

One or more of the teat cups of a set may also be cut entirely out of operation by turning the cocks 26 to their cut off position. The effective suction pressure at each set of teat cups is automatically regulated by adjusting the tension of the spring 34. If this spring 34 is adjusted to a low tension, if the suction increases, it operates on the piston 29 to open the valve 33 and relieve the situation by letting air into the tubes and mechanism. In case the spring 34 is placed under greater tension, a higher rarefaction may be attained before this safety valve device will operate. This mechanism consisting of the valve 33 and its connecting parts is also useful for manual operation in relieving the suction when it is desired to remove the teat cup from the teat, and is also useful for providing an intake of air to blow out the milk in the tubes 25ª and enable it to reach the receiving receptacle 41.

The elastic mouthpiece 10 provided at the upper end of the teat cups enables cups to be fitted to teats more readily of somewhat varying sizes and facilitates the teat cup being maintained in position on the teat by the suction applied at the lower end. It will be noted that the mouthpiece 10 may be readily displaced from its position on the teat cup and that the lining 7 may be readily removed and replaced in case of necessity.

The machine may also be operated entirely by suction if desired. To that end there is a port 75 provided between the exhaust chamber 55 and the base of suction tube 47. This port is adapted to be closed when the device is used as a combination pressure and suction machine by the set valve 76. When the valve 76 is open a suction is applied to what would otherwise be the exhaust of the pressure side, and the atmospheric pressure is utilized to operate both sides of the apparatus. In order to prevent an intake of air through the exhaust pipe 57 there is provided in this pipe a stop cock 57ª, which must be closed when the apparatus is operated by suction only.

The screen device shown in Figs. 8ª, 8ᵇ and 8ᶜ consists of a small chamber 80 filled with alternating sieves or screens 81 and rings 82. This screen device may be inserted between the stop cock 46ª and the body of the pulsator and in case the device is employed to operate by suction only the stop cock 46ª may be dispensed with.

What I claim as new and desire to secure by Letters Patent is:

1. The combination in a teat cup for milking machines of a generally cylindrical casing or shell having internal spaced encircling ribs, a flexible tubular lining attached to the casing at each end, an inlet port above the upper rib and outlet ports between the several ribs and means for supplying fluid to and withdrawing it through said ports, substantially as set forth.

2. The combination in a teat cup for a milking machine of a generally cylindrical casing or shell having internal spaced encircling ribs, a cap closing the lower end of the casing or shell, a flexible tubular lining attached to the casing at each end, an inlet port above the upper rib and outlet ports between the several ribs, and means for supplying fluid to and withdrawing it through said ports, and means for applying a suction at the lower end of the teat cup to the space within the lining, substantially as set forth.

3. The combination in a teat cup for a milking machine of a generally cylindrical casing or shell having internal spaced encircling ribs and a cap closing the lower end of the shell, a flexible tubular lining attached to the casing at each end, an inlet port above the upper rib and outlet ports between the several ribs, a flexible mouthpiece provided at the upper end of the casing, means for supplying fluid to and withdrawing it through said ports, and means for applying a suction to the lower end of the teat cup within said lining, substantially as set forth.

4. A pulsator for milking machines, consisting of a cylinder having longitudinally movable valves 42, having chambers $d$, $e$, $f$, $g$ and $h$, ports 44, 48, 49 and 50 controlled by and operating in connection with said valve, and means for causing the reciprocation of said valve, substantially as set forth.

5. A pulsator for milking machines, consisting of a cylinder having a longitudinally movable valve 42, having chambers $d$, $e$, $f$, $g$ and $h$, ports 44, 48, 49 and 50 controlled by and operating in connection with said valve, and ports for supplying fluid under pressure to the ends of the cylinder for reciprocating said valve, substantially as set forth.

In witness whereof, I have affixed my signature, in presence of two witnesses, this 4 day of March 1907.

WILLIAM J. UEBLER.

Witnesses:
H. S. CRISMAN,
GEO. E. RENDELL.